April 20, 1943.   W. S. TABER   2,317,154
INTERNAL COMBUSTION ENGINE
Filed May 7, 1941   7 Sheets-Sheet 4

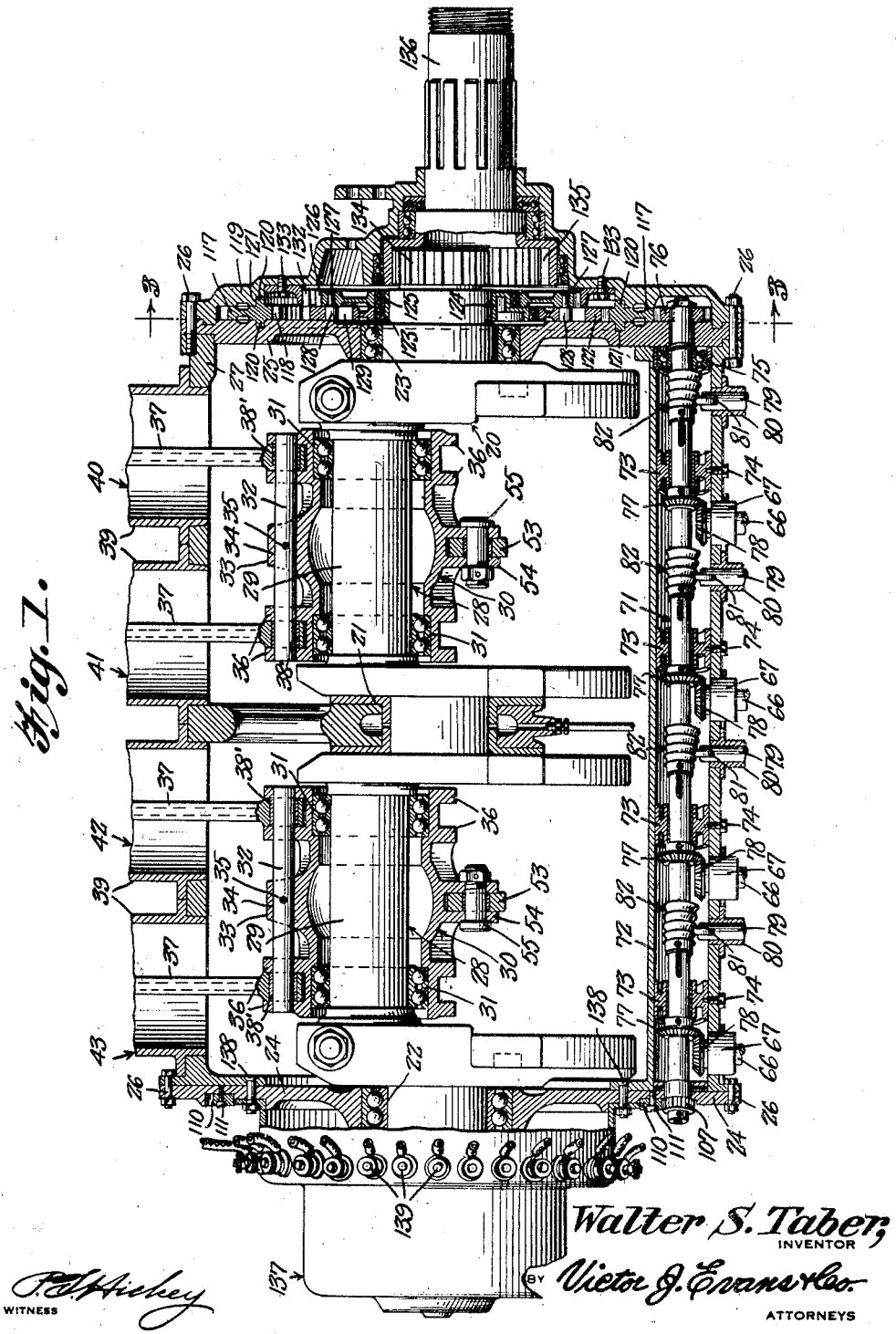

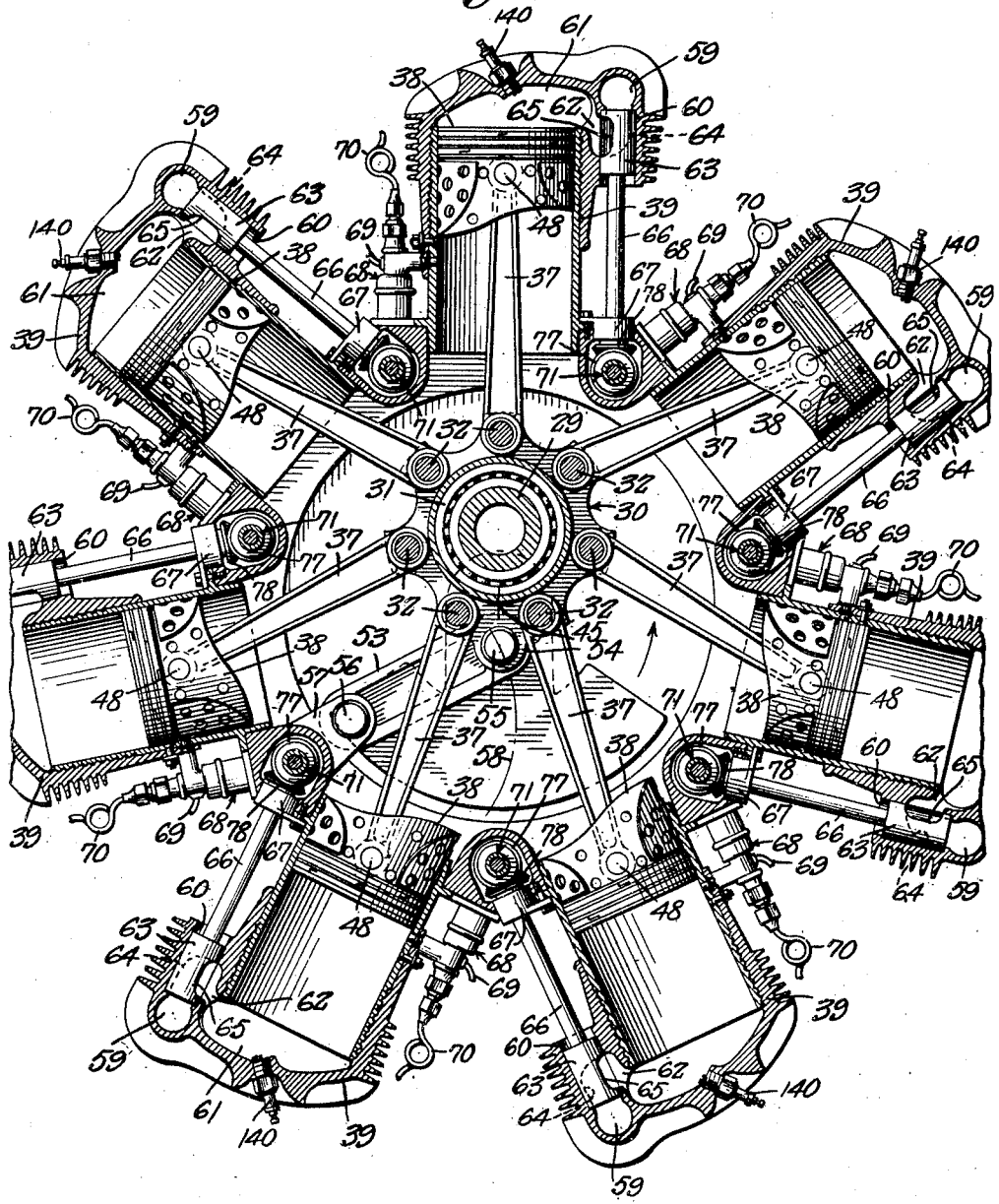

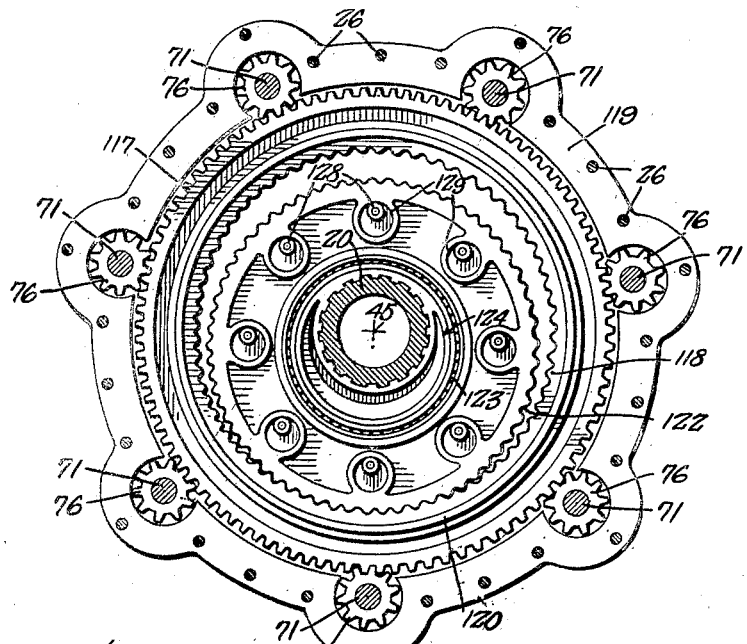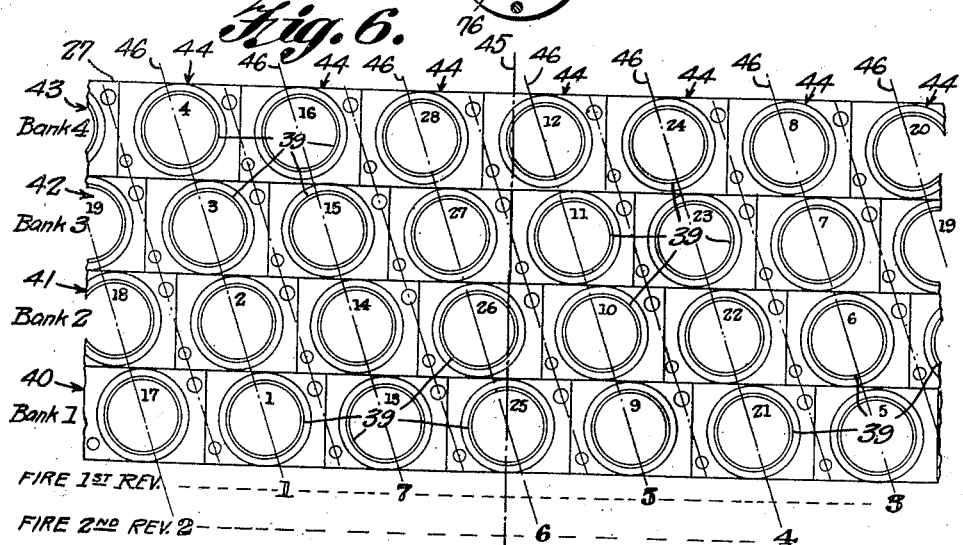

Walter S. Taber,
INVENTOR

BY Victor J. Evans & Co.
ATTORNEYS

WITNESS

April 20, 1943.     W. S. TABER     2,317,154
INTERNAL COMBUSTION ENGINE
Filed May 7, 1941     7 Sheets-Sheet 5

Walter S. Taber,
INVENTOR
BY Victor J. Evans & Co.
ATTORNEYS

April 20, 1943.　　　W. S. TABER　　　2,317,154
INTERNAL COMBUSTION ENGINE
Filed May 7, 1941　　　7 Sheets-Sheet 6
Fig. 8. BANK No. 1
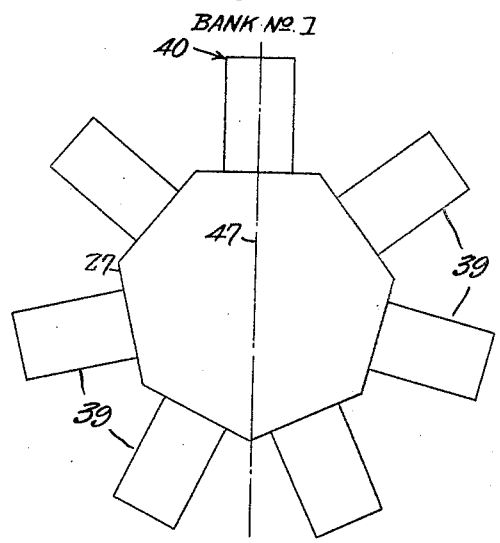
Fig. 9. BANK No. 2
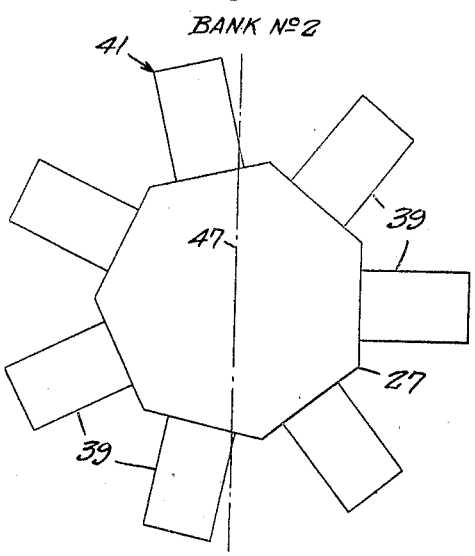
Fig. 10. BANK No. 3
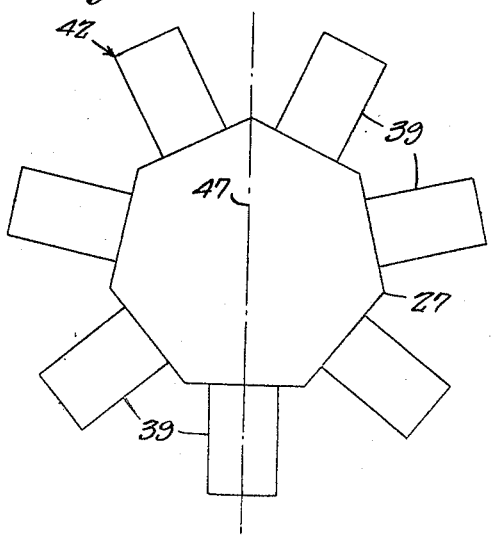
Fig. 11. BANK No. 4
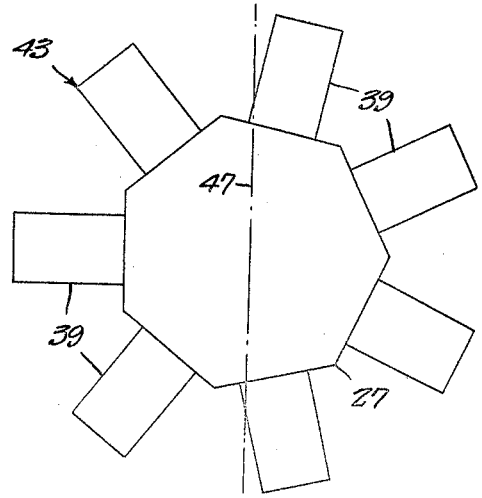
Walter S. Taber,
INVENTOR
BY Victor J. Evans & Co.
ATTORNEYS
P. H. Hickey
WITNESS April 20, 1943.  W. S. TABER  2,317,154
INTERNAL COMBUSTION ENGINE
Filed May 7, 1941  7 Sheets-Sheet 7
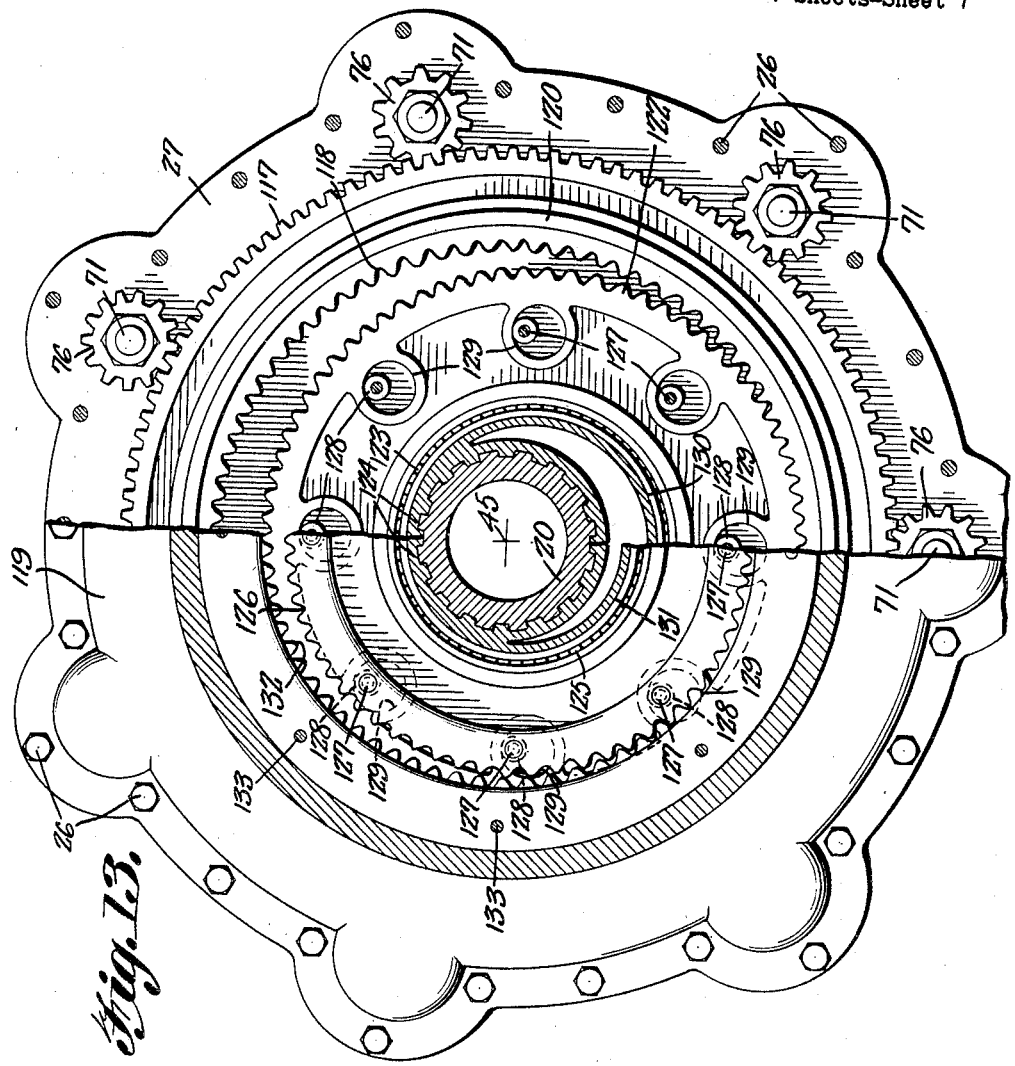

Patented Apr. 20, 1943

2,317,154

UNITED STATES PATENT OFFICE 2,317,154

INTERNAL COMBUSTION ENGINE

Walter S. Taber, Honolulu, Territory of Hawaii

Application May 7, 1941, Serial No. 392,353

3 Claims. (Cl. 74—51)

My invention relates to internal combustion engines, and has among its objects and advantages the provision of an improved airplane engine designed to facilitate incorporation of a relatively large number of cylinders in the engine, with the cylinders so arranged as to provide an exceptionally compact and small engine having a large horse-power rating, together with novel operating connections between the pistons and the crankshaft. The engine also embodies novel rotary exhaust valves and fuel injection means, together with novel facilities for varying the amount of fuel injected into the respective cylinders.

In the accompanying drawings:

Figure 1 is a longitudinal sectional view of an engine in accordance with my invention;

Figure 2 is a transverse sectional view;

Figure 3 is a view taken along the line 3—3 of Figure 1;

Figure 6 is a diagrammatic plan view illustrating the radial engine flattened for the purpose of showing the grouping of the cylinders in four banks of seven cylinders in each bank;

Figure 8 is a diagrammatic view illustrating the radial arrangement of the cylinders in the first bank;

Figure 9 is a diagrammatic view illustrating the arrangement of the cylinders in the second bank;

Figure 10 is a diagrammatic view illustrating the arrangement of the cylinders in the third bank;

Figure 11 is a diagrammatic view illustrating the arrangement of the cylinders in the fourth bank;

Figure 12 is a sectional view illustrating the camshaft driving mechanism; and

Figure 13 is an end elevational view of the engine crankcase with certain parts broken away for the purpose of illustrating the camshaft driving mechanism of Figure 12.

Figure 4:
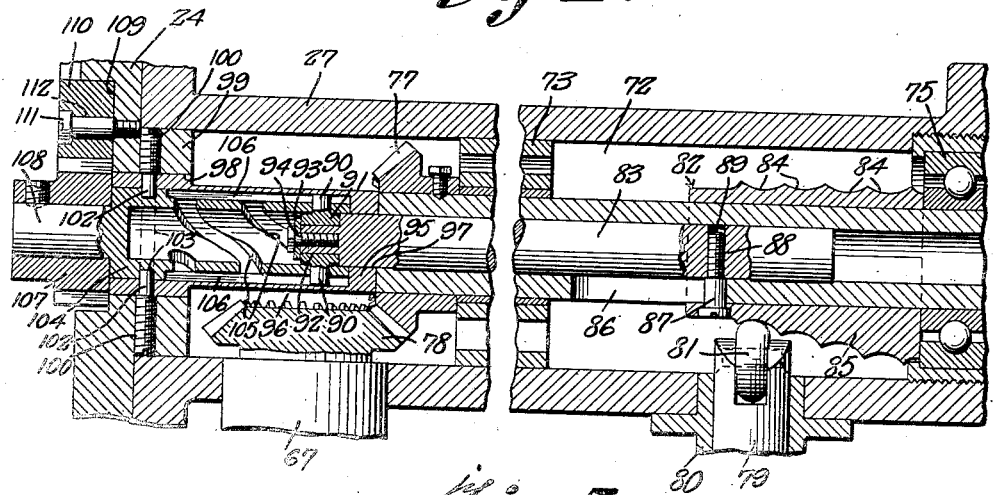
Figure 4 is a sectional detail view of one of the controls for varying the amount of fuel injected into a cylinder.

In the embodiment selected to illustrate my invention, Fig. 1 illustrates a crankshaft 20 rotatably supported in a central bearing 21 and end bearings 22 and 23 respectively secured to end plates 24 and 25 bolted at 26 to the crankcase 27. The crankshaft includes two cranks 28, the crankpins 29 of which are arranged in axial alignment, as in Fig. 1.

Upon each of the crankpins 29 is mounted a spider 30, which spiders are rotatably supported thereon through the medium of bearing assemblies 31. Each spider 30 carries seven pivot rods 32 which are equally spaced one from the other and concentrically arranged about the axis of their respective crankpin 29. The pivot rods 32 of each spider is axially aligned with the pivot rods of the other spider. Projections 33 are formed on the spiders 30 intermediate their ends and provided with bores 34 for the reception of the pivot rods, which pivot rods are made secure by key pins 35.

At each end of each spider 30 is fashioned two spaced flanges 36, which flanges are bored for the reception of the pivot rods 32. Two connecting rods 37 have bearing connections 38 with each of the pivot rods 32, which bearing connections are located between the flanges 36. Accordingly, there is a total of twenty-eight connecting rods 37, each connected with a piston 38, as illustrated in Fig. 2, and each piston operates in an individual cylinder 39 mounted about the crankcase 27. Thus there are four banks 40, 41, 42 and 43 arranged circumferentially about the axis of the crankshaft 20, and there are seven cylinders in each bank, as illustrated in Fig. 6.

In Fig. 6, the cylinders 39 are also arranged in straight rows 44 which are arranged at an angle to the crankshaft axis 45, as indicated by the lines 46. In other words, the cylinders might be said to be spirally arranged about the axis of the crankshaft. Figs. 8 through 11 illustrate the degree of spiral alignment of the banks of cylinders 40 through 43 with respect to a common plane 47 through the axis of the crankshaft 20.

Figure 7:
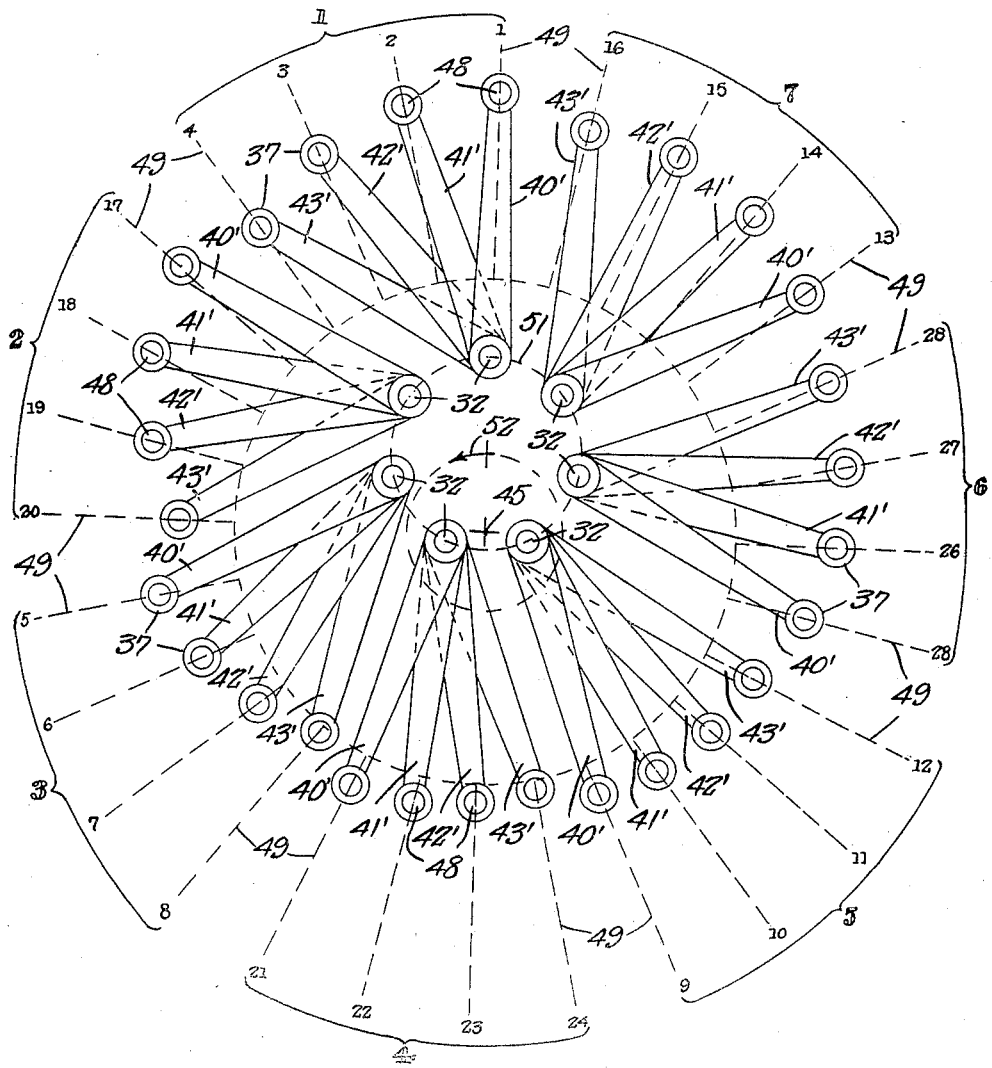
Figure 7 is a diagrammatic view illustrating the arrangement of the connecting rods of all the cylinders, as when viewed from the power take-off end of the crankshaft.

Fig. 7 illustrates all the connecting rods 37 in association with the pivot rods 32 and their respective wrist pins 48. This view also illustrates the manner in which the connecting rods 37 are also grouped in numbers of four about each of two axially aligned pivot rods 32. The axes of the cylinders 39 are indicated by the radial lines 49 which are equally spaced and diverge from the axis 45 of the crankshaft. While the axes 49 radiate from the axis 45, each group of four connecting rods 37 connected with two axially aligned pivot rods 32 is arranged in tangential alignment with respect to the circle 51 passing through the axes of the pivot rods 32. Crankshaft 20 rotates in the direction of the arrow 52. For the sake of convenience, the connecting rods 37 of Fig. 7 associated with the banks of cylinders 40 through 43 of Fig. 6 are respectively numbered 40' through 43'.

The cylinders 39 in each row 44 fire in succession, and the order in which the respective rows 44 is fired is indicated by the numerals 1 through 7 in Fig. 6, with the numerals arranged to represent two successive revolutions of the crankshaft 20.

In Fig. 1, a master rod link 53 is provided for each of the spiders 30, the lengths of the links being more clearly shown by the one link illustrated in Fig. 2. The links are identical in construction and operation. According to Fig. 1, each spider is provided with two spaced lugs 54 which carries a bearing pin 55, and the master rod links 53 each has an end positioned between two of the flanges and pivotally connected with one of the bearing pins 55. The opposite ends of the bearing pins are pivotally connected with pins 56 secured to lugs 57 which may be cast integrally with the case 27. Rotation of the crankshaft 20 causes the master rod links 53 to oscillate about the coaxial axes of the pins 56 so that the pins 55 connecting the links with the spiders 30 will oscillate in accordance with the arc 58.

Each of the cylinders 39 is provided with an exhaust port 59 having communication with a bore 60 having its axis paralleling the axis of its respective cylinder. Bore 60 has communication with the combustion chamber 61 through the medium of a passage 62. Rotatably disposed in each of the bores 60 is an exhaust valve 63 which is provided with an axial bore 64 communicating with the exhaust port 59 and with the passage 62 through the medium of a side opening 65. Each exhaust valve 63 is connected with a drive shaft 66, which drive shaft also has its axis paralleling the axis of its respective cylinder. Bearings 67 coact with the bores 60 to rotatably support and guide the respective exhaust valves and drive shafts 66.

Each cylinder 39 is also provided with a fuel injection device 68 having communication with air and fuel conduits 69 and 70, respectively. Fuel injection devices 68 may be of any suitable design. Suffice it to say that the fuel is injected by a plunger, and means are provided in the instant case for variably actuating such plungers. For this purpose, and also for the purpose of rotating the exhaust valves 63, seven camshafts 71 are provided, which camshafts are arranged concentrically about the axis 45, see Fig. 2, and are located at the bases of the cylinders 39. Each cylinder has an exhaust valve 63 on one side and a fuel injection device 68 located on the diametrically opposite side, and the respective exhaust valves and fuel injection devices are arranged on the same sides of their respective cylinders. According to Fig. 2, the exhaust valve of each cylinder is operatively connected with the camshaft 71 which operates the fuel injection device 68 of the next cylinder when viewing the arrangement thereof in a clockwise direction. In view of the spiral arrangement of the cylinder rows 44, the camshafts 71 have their axes aligned in accordance with the lines 46 of Fig. 6. Since all the camshafts are identical in construction and operation, the description of one will apply to all.

Fig. 1 has been sectioned through the lower wall of the case 27 at an angle to expose the full length of one of the camshafts 71. The case 27 is bored at 72 for accommodating the camshaft 71, and the latter is supported by bearings 73 arranged at suitable intervals inside the bore 72 and secured against displacement by means of set screws 74. One bearing 75 is threaded into the bore 72 at one end thereof, and the end plate 25 is bored so that one end of the camshaft may extend to a position exteriorly of the crankcase for connection with a driving pinion 76 keyed to the camshaft, as best illustrated in Figs. 1 and 12. Rotary motion of the camshaft 71 imparts rotary motion to the four drive shafts 66 through the medium of bevel gears 77 keyed to the camshaft and bevel gears 78 keyed to the drive shafts 66. There are four drive shafts 66 operatively connected with each of the camshafts 71.

In Fig. 1, four plunger rods 79 are associated with the camshaft 71. These rods may be slidably guided by tubular guides 80, and each plunger rod is provided with a roller 81 for coaction with a cam device 82 keyed to the camshaft for rotation therewith but arranged for relative axial movement thereon. There are four cam devices 82 for each of the camshafts 71.

Fig. 4 illustrates one of the cam devices 82 and, since all are identical in construction and operation, the description of one will apply to all. Camshaft 71 is hollow for slidably supporting a cam adjusting rod 83. The cam device 82 is in the nature of a sleeve slidably mounted on the camshaft 71 and provided with four circumferential grooves 84 for guiding the roller 81, with the cam provided with a tapering body 85 properly aligned so as to secure four different throws to the end that the plunger rod 79 may be actuated to deliver variable amounts of fuel to the cylinder, depending upon the position of the cam axially of the camshaft.

In Fig. 4, the cam device 82 is situated in the extreme position which imparts the least thrust action to the plunger rod 79. Movement of the cam device 82 to the left, as when viewing Fig. 4, brings the next throw into operative alignment with the roller 81 for increasing the thrust action of the plunger rod. The cam device may be moved in stages, and the gentle angularity of the grooves 84 and the curvature of the roller 81 facilitate sliding of the cam device relatively to the roller.

A slot 86 is provided in the camshaft 71 for passage of a screw 87 which connects the cam device 82 with the cam adjusting shaft 83. The screw 87 has a threaded shank 88 threaded into the transverse bore 89 in the rod 83. As previously suggested, the cam shaft 71 is provided with a total of four slots 86 so as to provide accommodation for the screws 87 which connect the respective cam devices 82 with the shaft. Relative axial movement of the shaft 83 inside the camshaft 71 is secured through the medium of pins 90 which project radially from a collar 91 mounted loosely on a neck 92 fashioned coaxially of one end of the cam control shaft 83. Collar 91 is held in position on the neck 92 by a retaining washer 93 and a bolt 94 passing through the retaining washer and threaded into the neck 92.

One end of the camshaft 71 abuts an end wall 95 of a sleeve 96 having a bore 97 through which the cam actuating rod 83 slidably extends, which sleeve has one end fitting in a bore 98 in a boss 99 formed on the end plate 24, with the boss pressed into the bore 72 and fixedly secured to the sleeve 96 by set screws 100 threaded into the boss and provided with pins 102 which extend through openings in the sleeve 96 and into a circumferential groove 103 in an inner sleeve 104 which fits snugly inside the sleeve 96 but may be rotated relatively thereto. The pins 90 extend through spiral slots 105 in the inner sleeve 104 and into grooves 106 extending longitudinally of the sleeve 96 in its inner wall. Thus rotation of the inner sleeve 104 will impart longitudinal motion to the cam actuating shaft 83, since the collar 91 is mounted loosely on the neck 92 of the shaft and the pins 90 are restrained from rotary motion by reason of the grooves 106.

Figure 5:
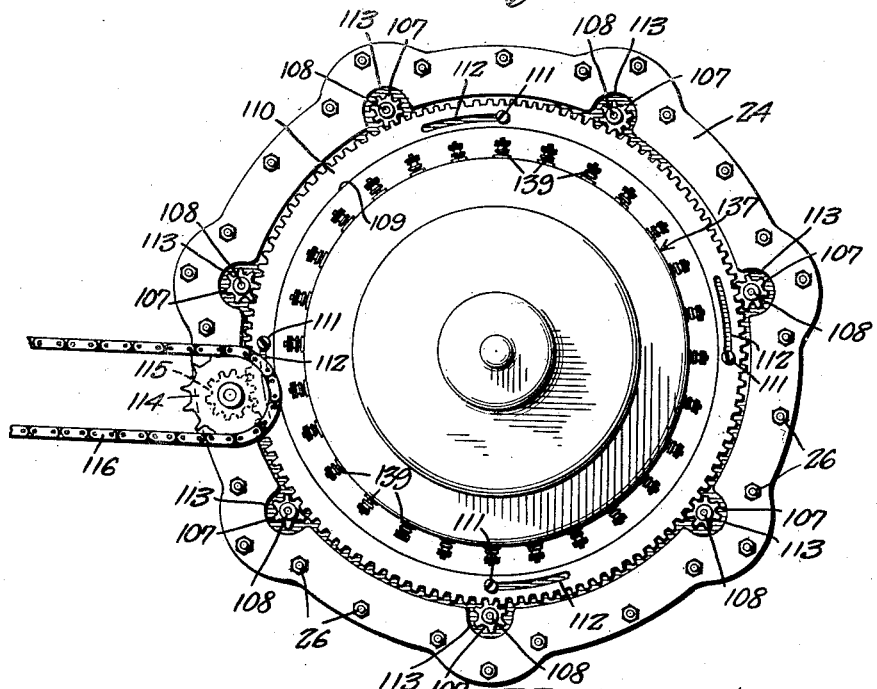
Figure 5 is an end view of the engine crankcase illustrating the arrangement of the spark plugs and the actuating means for the series of control devices such as that illustrated in Figure 4.

Means for rotating the cam actuating shaft 83 through the medium of rotary motion imparted to the inner sleeve 104 comprises a pinion 107 keyed to a shaft 108 formed integrally with the inner sleeve 104. End plate 24 is provided with a circular groove 109 for partly housing a ring gear 110. This ring gear is best illustrated in Fig. 5. Bolts 111 are threaded into the end plate 24 and extend through slots 112 in the ring gear, which slots are arranged concentrically of the axis of the ring gear, and the heads of the bolts hold the ring gear against the bottom face of the groove 109, but the ring gear may be oscillated about its axis a distance corresponding to the length of the slots 112.

Each camshaft 71 is constructed identically with the structure of Fig. 4, so that there are seven pinions 107 meshing with the ring gear 110, and the pinions 107 are partly housed in recesses 113 opening into the circular groove 109. Oscillation of the ring gear 110 imparts similar motion to the inner sleeve 104 which in turn imparts longitudinal motion to the shaft 83 but the shaft may rotate as a unit with the camshaft 71 because of the loose connection between the neck 92 and the collar 91.

Rotation of the ring gear 110 is accomplished through the medium of a sprocket 114 rotatably mounted on the end plate 24 and fixedly connected with a pinion 115 which meshes with the ring gear 110. A chain 116 is connected with the sprocket 114 for imparting rotation thereto, and the chain may be actuated through any suitable means (not shown), as for example, a manually actuated sprocket located in a convenient position to be readily accessible by the operator of the engine.

In Figs. 3 and 1, each of the pinions 76 is in mesh with a gear 117 fashioned with an internal ring gear 118, both of which are concentrically arranged with respect to the axis 45. In Figs. 1 and 12 in particular, the ring gear 117 is housed between the outer face of the end plate 25 and a gear housing plate 119, with the ring gear provided with circular flanges 120 fitting in grooves 121 in the two plates. Grooves 121 and the flanges 120 coact to maintain the gear 117 concentrically about the axis 45 but permit rotation of the gear to turn the pinions 76. Gear housing plate 119 is made secure by the bolts 26.

Internal ring gear 118 meshes with an external ring gear 122 mounted on a bearing 123 mounted on a sleeve-like member 124 keyed to the crank-shaft 20. A second bearing 125 is mounted on the sleeve-like member 124, which bearing carries an external ring gear 126. A series of pins 127 is secured to the ring gear 126, and each pin is provided with a roller 128 which is in engagement with the peripheral face of a bore 129 in the external ring gear 122. Bores 129 are considerably larger in diameter than the rollers 128.

Sleeve member 124 is fashioned with an eccentric 130 of somewhat larger diameter than the eccentric 131 also fashioned on the sleeve-like member. Bearing 123 is mounted on the eccentric 130 while the bearing 125 is mounted on the eccentric 131, the two eccentric throws having a common alignment, as more illustrated by the arrangement of the bearings 123 and 125 in Fig. 13. Ring gear 126 meshes with an internal ring gear 132 bolted at 133 to the gear housing plate 119. Internal ring gear 132 is concentrically positioned with respect to the axis 45.

Since the gears 122 and 126 are eccentrically arranged with respect to their meshing gears 118 and 132, respectively, the two latter being concentrically positioned with respect to the axis 45, rotation of the crank shaft 20 will impart a rolling motion to the gears 122 and 126 as they rotate. The relative ratios of the gears are such as to turn the camshaft 71 in proper timed relation with the crankshaft. The openings 129 in the gear 122 are of such diameter as to permit the gear to roll in mesh engagement with the internal ring gear 118, which rolling and rotary motion is imparted to the gear 122 by reason of the rollers 128 carried by the gear 126.

According to Fig. 1, a pinion 134 is secured to the crankshaft 20 and meshes with a gear 135 fixed to the power take-off shaft 136, on which the propeller (not shown) is mounted.

A housing 137 is secured to the end plate 24 by bolts 138, and the housing serves as a mount for the current distributing terminals 139 which are connected with the spark plugs 140 carried by the cylinders 39.

In the twenty-eight cylinder job illustrated, the internal ring gear 118 may have eighty teeth, the gear 122 seventy-five teeth, the external ring gear 126 forty-seven teeth and the gear 132 fifty-six teeth. The driving connection between the crankshaft 20 and the pinions 76 constitutes an epicyclic gear train through the medium of which the necessary gear reduction is readily attained. The gear 117 is rotated in the same direction as the crankshaft 20 at a speed ratio of 1 to 14, and the number of teeth in the gear 117 and the pinions 76 are easily determined when once the speed ratio is known. The epicyclic gear train provides a speed translating mechanism of exceptionally simple and durable structure.

The gear 134 has a speed ratio of 2 to 1 with respect to the power take-off shaft 136.

Having thus described certain embodiments of my invention in detail, it is, of course, understood that I do not desire to limit the scope thereof to the exact details set forth except insofar as those details may be defined in the appended claims.

I claim:

1. In an internal combustion engine, having a crank shaft, a tubular member adapted for rotary mounting on the crank pin of the shaft, a pair of annular axially spaced flanges on the exterior of the said member at each end, the said flanges having aligned bores at circumferentially spaced intervals, a plurality of circumferentially spaced projections on the exterior of the tubular member intermediate its ends, each projection having a bore therethrough axially of the member, and a pivot rod extending through the aligned flange and projection bores with its end portions extending through the bores of the pair of flanges at each end and its center portion extending through the bore of the projection.

2. In an internal combustion engine, having a crankshaft, a tubular member adapted for rotary mounting on the crank pin of the shaft, a pair of annular axially spaced flanges on the exterior of the said member at each end, the said flanges having aligned bores at circumferentially spaced intervals, a plurality of circumferentially spaced projections on the exterior of the tubular member intermediate its ends, each projection having a bore therethrough axially of the member, a pivot rod extending through the bore of each projection and the bores in the end flanges in alignment therewith, the said rod having a transverse bore through its center portion aligning with transverse bores in each projection, and a key pin extending through the said transverse bores to secure each pivot rod against axial displacement.

3. In an internal combustion engine, having a crank shaft, a tubular member adapted for rotary mounting on the crank pin of the shaft, a pair of annular axially spaced flanges on the exterior of the said member at each end, the said flanges having aligned bores at circumferentially spaced intervals, a plurality of circumferentially spaced projections on the exterior of the tubular member intermediate its ends, each projection having a bore therethrough axially of the member, a pivot rod extending through the bore of each projection and the bores in the end flanges in alignment therewith, the said rod having a transverse bore through its center portion aligning with transverse bores in each projection, a key pin extending through the said transverse bores to secure each pivot rod against axial displacement, a pair of spaced lugs on the intermediate portion of the tubular member, and a link having one end pivotally connected to the said lugs and its opposite end adapted for pivot fastening to the engine casing.

WALTER S. TABER.